United States Patent [19]

Jones

[11] Patent Number: 5,684,981

[45] Date of Patent: Nov. 4, 1997

[54] MEMORY ORGANIZATION AND METHOD FOR MULTIPLE VARIABLE DIGITAL DATA TRANSFORMATION

[75] Inventor: Arlin R. Jones, Boise, Id.

[73] Assignee: Hewlett-Packard Company, Palo Alto, Calif.

[21] Appl. No.: 375,096

[22] Filed: Jan. 18, 1995

[51] Int. Cl.$^6$ .................................................. G06F 12/06
[52] U.S. Cl. .................. 395/516; 395/131; 395/510; 364/723; 345/153; 345/186; 345/200; 358/523; 358/525; 382/162
[58] Field of Search .................................. 395/109, 119, 395/127, 131, 138, 510, 516; 345/112, 153–155, 185–187, 189, 190, 199, 200; 358/518, 519, 523, 525, 455, 456; 382/162, 167; 364/723

[56] References Cited

U.S. PATENT DOCUMENTS

| 4,837,722 | 6/1989 | Sara | 364/723 |
|---|---|---|---|
| 4,949,280 | 8/1990 | Littlefield | 395/163 |
| 5,175,701 | 12/1992 | Newman et al. | 364/723 |
| 5,185,661 | 2/1993 | Ng | 358/515 |
| 5,321,797 | 6/1994 | Morton | 395/131 |

FOREIGN PATENT DOCUMENTS 0 497 466 A1  8/1992  European Pat. Off. ......... H04N 1/46

OTHER PUBLICATIONS

European Search Report.
"High–Speed Processor Transforms Colors", Junko Ushida, Electronic Engineering Times, Nov. 9, 1992, p. 35.
"RGB to CMYK Color Space Conversion Considerations", Brooktree, Application Note XX, Apr., 1990, pp. 2–5 to 2–11, pp. SL–1 to SL–7.

*Primary Examiner*—Kee M. Tung

[57] ABSTRACT

A method and device for multidimensional data transformation is disclosed. A multidimensional, non-linear data memory storage construct provides simultaneous access to data in all dimensions without duplication of memory. For "n" dimensions, $2^n$ locations describe the smallest subarea location in the multidimensional construct. Therefore, $2^n$ memory banks are provided in which to store corresponding interpolation data. By recognizing that boundary points of the n-dimensions are common, duplication of memory is avoided by providing an addressing and sorting mechanism which allows interpolation of stored data correlated to the input data.

27 Claims, 9 Drawing Sheets

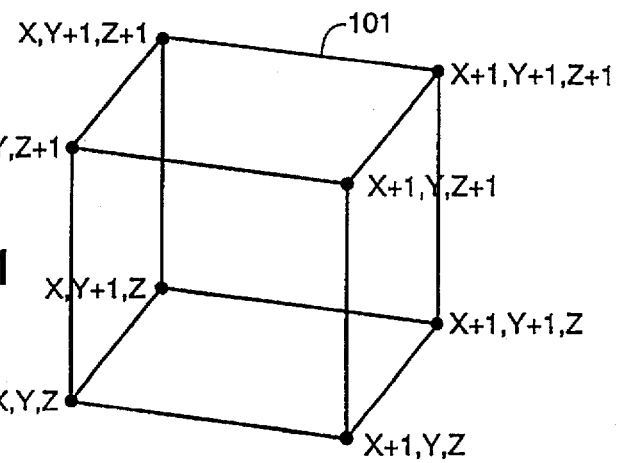
FIG. 1
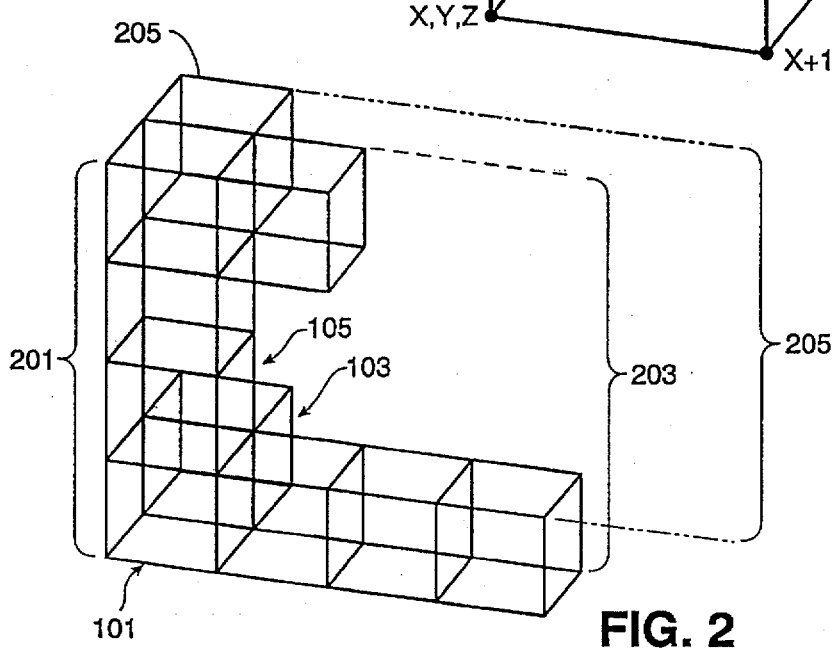
FIG. 2
FIG. 3A
FIG. 3B
FIG. 3C

FROM FIG. 13

TABLE 1

| MEMORY BANK NO. | ADDRESS CALCULATION |
|---|---|
| 7₁₁₁ | RH, GH, BH |
| 6₁₁₀ | RH+R(4), GH, BH |
| 5₁₀₁ | RH, GH+G(4), BH |
| 4₁₀₀ | RH+1, GH+G(4), BH |
| 3₀₁₁ | RH, GH, BH +B(4) |
| 2₀₁₀ | RH+R(4), GH, BH+B(4) |
| 1₀₀₁ | RH+ GH+G(4), BH+B(4) |
| □₀₀₀ | RH+R(4), GH+G(4), BH+B(4) |

FIG. 10 - Table 2

| BANK # | CODE | BANK # | CODE | BANK # | CODE | BANK # | CODE | BANK # | CODE | BANK # | CODE | BANK # | CODE | BANK # | CODE |
|---|---|---|---|---|---|---|---|---|---|---|---|---|---|---|---|
| 23 01 | | 32 10 | | 76 54 | | 01 23 | | 45 67 | | 10 32 | | 76 54 | | | |
| 67 45 | | 67 45 | | 32 10 | | 76 54 | | 10 32 | | 54 76 | | 67 45 | | 01 23 | | 54 76 | | 10 32 |
| 0 | 000 | 0 | 001 | 0 | 001 | 0 | 010 | 0 | 011 | 0 | 101 | 0 | 100 | 0 | 110 | 0 | 111 |
| 1 | 000 | 1 | 000 | 1 | 000 | 1 | 010 | 1 | 010 | 1 | 100 | 1 | 100 | 1 | 110 | 1 | 110 |
| 2 | 000 | 2 | 001 | 2 | 000 | 2 | 000 | 2 | 001 | 2 | 101 | 2 | 100 | 2 | 100 | 2 | 101 |
| 3 | 000 | 3 | 000 | 3 | 000 | 3 | 000 | 3 | 000 | 3 | 100 | 3 | 100 | 3 | 100 | 3 | 100 |
| 4 | 000 | 4 | 001 | 4 | 001 | 4 | 010 | 4 | 011 | 4 | 001 | 4 | 000 | 4 | 010 | 4 | 011 |
| 5 | 000 | 5 | 000 | 5 | 000 | 5 | 010 | 5 | 010 | 5 | 000 | 5 | 000 | 5 | 010 | 5 | 010 |
| 6 | 000 | 6 | 001 | 6 | 000 | 6 | 000 | 6 | 001 | 6 | 001 | 6 | 000 | 6 | 000 | 6 | 001 |
| 7 | 000 | 7 | 000 | 7 | 000 | 7 | 000 | 7 | 000 | 7 | 000 | 7 | 000 | 7 | 000 | 7 | 000 |

TABLE 3

| MEMORY BANK NUMBERS | 000 | | 001 | | 010 | | 011 | | 100 | | 101 | | 110 | | 111 | |
|---|---|---|---|---|---|---|---|---|---|---|---|---|---|---|---|---|
| | IN | OUT | IN | OUT | IN | OUT | IN | OUT | IN | OUT | IN | OUT | IN | OUT | IN | OUT |
| | 0 | 0 | 0 | 4 | 0 | 2 | 0 | 6 | 0 | 1 | 0 | 5 | 0 | 3 | 0 | 7 |
| | 1 | 1 | 1 | 5 | 1 | 3 | 1 | 7 | 1 | 0 | 1 | 4 | 1 | 2 | 1 | 6 |
| | 2 | 2 | 2 | 6 | 2 | 0 | 2 | 4 | 2 | 3 | 2 | 7 | 2 | 1 | 2 | 5 |
| | 3 | 3 | 3 | 7 | 3 | 1 | 3 | 5 | 3 | 2 | 3 | 6 | 3 | 0 | 3 | 4 |
| | 4 | 4 | 4 | 0 | 4 | 6 | 4 | 2 | 4 | 5 | 4 | 1 | 4 | 7 | 4 | 3 |
| | 5 | 5 | 5 | 1 | 5 | 7 | 5 | 3 | 5 | 4 | 5 | 0 | 5 | 6 | 5 | 2 |
| | 6 | 6 | 6 | 2 | 6 | 4 | 6 | 0 | 6 | 7 | 6 | 3 | 6 | 5 | 6 | 1 |
| | 7 | 7 | 7 | 3 | 7 | 5 | 7 | 1 | 7 | 6 | 7 | 2 | 7 | 4 | 7 | 0 |

MEMORY ORGANIZATION AND METHOD FOR MULTIPLE VARIABLE DIGITAL DATA TRANSFORMATION

FIELD OF THE INVENTION

The present invention relates generally to data processing technology and, more specifically, to a memory system particularly suited to color data transformations.

BACKGROUND OF THE INVENTION

Colorimetry has long been recognized as a complex science. In general, it has been found possible and convenient to represent color stimuli vectors in a three-dimensional space, called tristimulus space. Essentially, as defined in 1931 by the Commission Internationale L'Eclairage (CIE), three primary colors (X, Y, Z) can be combined to define all light sensations we experience with our eyes (that is, the color matching properties of an ideal trichromatic observer defined by specifying three independent functions of wavelength that are identified with the ideal observer's color matching functions form an international standard for specifying color). The fundamentals of such three-dimensional constructs are discussed in the literature, such as *Principles of Color Technology*, by Billmeyer and Saltzman, published by John Wiley & Sons, Inc., N.Y., copyright 1981 (2d. ed.) and *Color Science: Concepts and Methods, Quantitative Data and Formulae*, by Wyszecki and Stiles, published John Wiley & Sons, Inc., copyright 1982 (2d ed.), incorporated herein by reference in pertinent parts, particularly pages 119–130.

Trichromatic model systems—such as red, green, blue (RGB); cyan, magenta, yellow, black (CMYK); hue, saturation, value (HSV); hue, lightness, saturation (HLS); luminance, red-yellow scale, green-blue scale (La*b*); YIQ used in commercial color television broadcasting; and the like—provide alternatives for the system designer. See such works as *Fundamentals of Interactive Computer Graphics*, by Foley and Van Dam, Addison-Wesley Publishing Company, incorporated herein by reference in pertinent parts, particularly pages 606–621, describing a variety of tri-variable color models.

Color transformation between model systems in digital data processing presents many problems to the original equipment manufacturer. The interpolation of data from one system to another system is difficult because the relationship between the systems are generally non-linear. Therefore, a crucial problem is the maintaining of color integrity between an original image from an input device (such as a color scanner, CRT display, digital camera, computer software/ firmware generation, and the like) and a translated copy at an output device (such as a CRT display, color laser printer, color ink-jet printer, and the like).

For example, computer artists want the ability to create a color image on a computer video and have a printer provide the same color in hard copy. Or, an original color photograph may be digitized with a scanner; resultant data may be transformed for display on a video monitor or reproduced as a hard copy by a laser, ink-jet or thermal transfer printer. As discussed in the reference materials cited, colors can be constructed as renderings of the additive primary colors, red, green, and blue (RGB), or of the subtractive primary colors, cyan, magenta, yellow and black (CMYK). A transformation may require going from an RGB color space, for example, a computer video monitor, to a CMYK color space, for example, a laser printer hard copy. A transformation from one color space to another requires complex, non-linear computations in multiple dimensions. Since such is not describable mathematically, the use of a very large look-up table, e.g. 50 megabytes, containing transformation data is generally required to go from an RGB system to a CMYK system. [Note: To maintain black color purity in printing, a separate black ink or toner is usually provided rather than printing all three cyan, magenta and yellow colors; the use of such a separate black rendition mechanism is assumed for the purpose of disclosing the present invention.]

In making the transform from one tristimulus system to another, the best solution may be obtained using trilinear interpolation methods as would be known to a person skilled in the art. When using a trilinear interpolation method, bytes of data correlated in three dimensions are represented as corners of a cube and the total look-up table is made of many such cubes. Each cube shares information with adjacent cubes. In other words, if the memory construct is visualized as a blocked cubic lattice in considering one corner of an internal block it will be recognized that such a point (e.g., a cell of a read-only memory or an addressable eight cell byte) is shared by eight blocks.

To get data points representing, for example, the three variables of an RGB tristimulus space construct for a particular color, either the lattice has to be accessed eight times, slowing the processing by a factor of eight, or the look-up table must be repeated in hard memory eight times, creating the obvious disadvantage of an increased memory requirement of the system. For the purpose of understanding the present invention, as known memory devices are two dimensional, the tri-linear interpolation problem can be summarized as the requirement of accessing data for three dimensions simultaneously without requiring redundant look-up tables as mentioned above.

One algorithmic interpolation solution is described briefly in Electronic Engineering Times, Nov. 9, 1992, page 35, *High-speed processor transforms colors*, by Junko Yoshida. However, Yoshida's "new algorithm" itself is not disclosed.

For color data transformations between an RGB space and a CMYK space using interpolation, there is a need for a mechanism that permits accessing eight adjacent data points, that is, all vertices from any cubic construct within the look-up table, simultaneously without duplicating the look-up table. The general method and apparatus disclosed herein is expandable for non-linear interpolation of any type of data that can be represented multidimensionally.

SUMMARY OF THE INVENTION

In its basic aspect, the present invention is an implementation of multidimensional, non-linear interpolation using a look-up table combined with an interpolator particularly suited for color space transformations. A device for transforming multiple variable, non-linear input data, where "n" is the number of variables, and for providing interpolated output data, includes: a set of $2^n$ memory banks, each having an input and an output, for storing transform data correlated to the input data at discrete addressable locations therein and for providing the transform data at each output; address generating logic, connected to each the memory input, for receiving a first set of predetermined bits of the input data and for providing an address to access one location of each the memory bank per input access cycle in accordance with the first set of predetermined bits of the input data, the memory providing accessed transform data at each output of the memory, respectively; sorting logic for sorting the transform data, having first input, connected to each the memory bank output, respectively, for receiving accessed transform data from the locations, second input connected to receive a first predetermined subset of the first set of predetermined bits of the input data such that the transform data is ordered in accordance with the first predetermined subset of the first set of predetermined bits of the input data, and output for outputting sorted transform data; and interpolating logic for interpolating the sorted transform data with a second set of predetermined bits of the input data, having first input, connected to the output of the sorting logic, for receiving the sorted transform data, second input connected to receive the second set of predetermined bits of the input data, and output for outputting interpolated output data based on interpolating the sorted transform data with the second set of predetermined bits of the input data.

It is an advantage of the present invention that it reduces memory requirements of a multidimensional data transformation processor, making integrated circuit implementation cost effective.

It is an advantage of the present invention that it provides a reduction in multidimensional data transformation computation time requirements.

It is still another advantage of the present invention that it can be economically implemented in an application specific integrated circuit ("ASIC").

It is yet another advantage of the present invention that it provides a method and apparatus for color data transformation that is sensitive to cost and data processing speed.

Other objects, features and advantages of the present invention will become apparent upon consideration of the following detailed description and the accompanying drawings, in which like reference designations represent like features throughout the FIGURES.

DESCRIPTION OF THE DRAWINGS

FIG. 1 is a spatial representation of one section of a generic lattice memory organization construct in accordance with the present invention.

FIG. 2 is a spatial representation of a subsection of a lattice memory organization construct comprising a multiplicity of sections as shown in FIG. 1.

FIGS. 3A–3C are a depiction of a slices of the spatial representation of a lattice memory organization construct as shown in FIGS. 1 and 2 with each cubic vertex assigned a node number.

FIG. 10 (TABLE 2) is complete listing of a memory address calculation for the construct of the present invention as shown in FIGS. 6 and 7.

Figure 4:
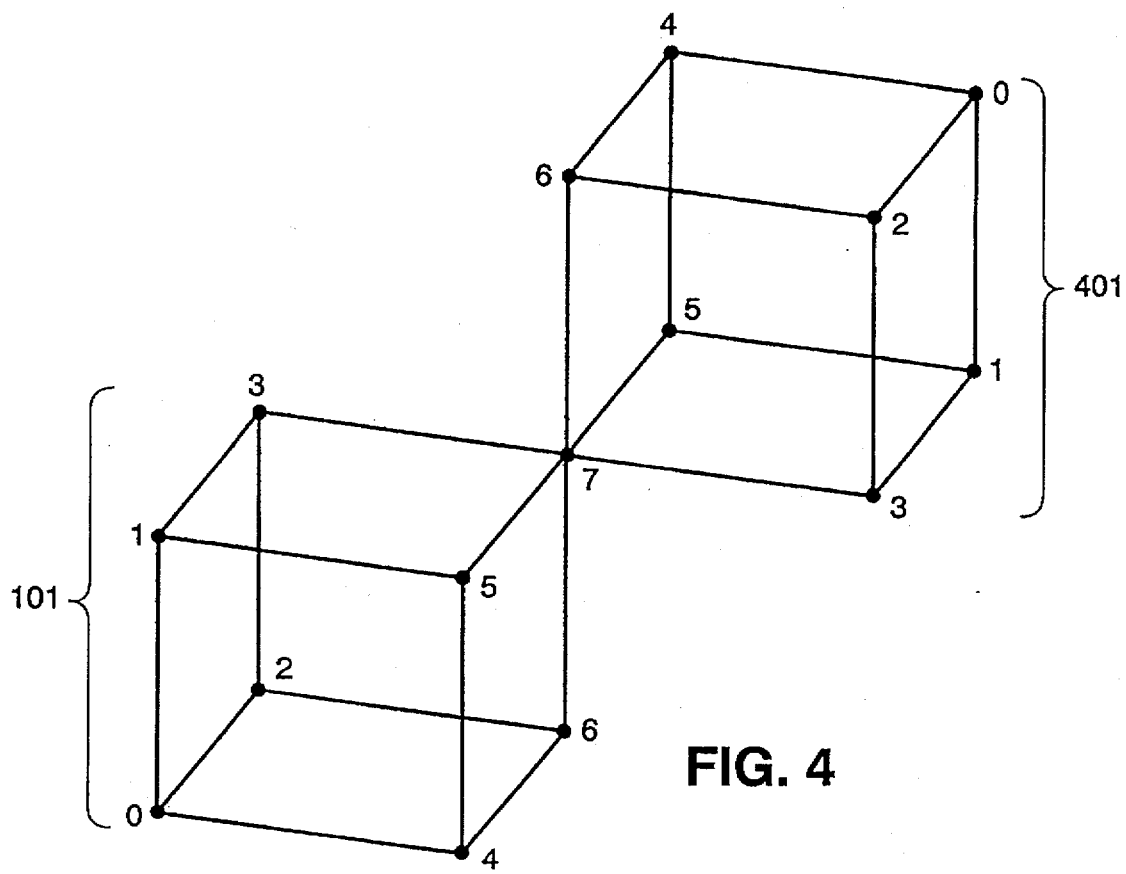
FIG. 4 is a spatial representation of the memory organization construct as shown in FIGS. 3A–3C, wherein all node numbers are mirrored.

The drawings referred to in this description should be understood as not being drawn to scale except if specifically noted.

Reference is made now in detail to a specific embodiment of the present invention, which illustrates the best mode presently contemplated by the inventor(s) for practicing the invention. Alternative embodiments are also briefly described as applicable.

DETAILED DESCRIPTION OF THE INVENTION

A solution to the problem of non-linear, multi-variable data interpolation without duplication of memory lays in simulation of a multi-dimensional space by providing a memory organization construct, addressing scheme, and sorting method emulating the simultaneous accessing of all of the vertices of a spatial representation of the data. In a color transformation, used as an exemplary embodiment herein, a transformation from one color space to another is performed by creating a method and apparatus for a trilinear interpolation using a cubic spatial representation. [Note: It will be recognized that this concept may be expanded to access $2^n$ adjacent vertices in a n-dimensional space. Similarly, the exemplary embodiment is given with an 8-bit byte of data, whereas the system can be expanded accordingly for m-bit byte data. Therefore, while the generic fundamentals are explained in the exemplary embodiment in terms of three dimensional space, it should be recognized that by use of the example the inventor does not intend any limitation on the scope of the invention nor should any be implied.]

MEMORY ORGANIZATION CONSTRUCT

First, consider a generalized three dimensional memory organization construct derived using what is necessarily two dimensional memory device, such as an integrated circuit memory. Referring to FIG. 1, three vectors X, Y and Z, each defining a number of digital data bits, "m," can be defined in terms of a three dimensional space, a cube 101, such that any point in the space can be addressed by the concatenation of:

X(m–1, m–2, . . . , 0),

Y(m–1, m–2, . . . , 0), and

Z(m–1, m–2, . . . , 0).

Each corner of the cube would then be defined as shown in FIG. 1. For the purpose of disclosing the present invention, an exemplary embodiment where X, Y and Z are limited to eight bits such that each vector becomes:

X(7 . . . 0),

Y(7 . . . 0), and

Z(7 . . . 0).

The representative memory organization of the present invention is made up of a three dimensional array of such cubes as shown in FIG. 2, a subsection of a three dimensional space of the entire representative memory organization construct. Representative cubes 101, 103, 105 can be said to represent different, addressable locations of memory in that each vertex of a cube is assigned a unique node number such that there are no two identical node numbers adjacent to each other in a three dimensional lattice of cubes. Referring to FIGS. 2 and 3, the front plane 201 of FIG. 2 of a completed 4×4×4 cubic lattice is shown with node numbers in FIGS. 3A–3C, for example:

0=lower-left-front vertex (LLF), cube 101;
1=upper-left-front vertex (ULF), cube 101;
4=lower-right-front vertex (LRF), cube 101; and
5=upper-right-front vertex (URF), cube 101.

The next back plane 203 is assigned a different set of node numbers, recognizing that adjacent cubes share nodes, for example:

2=lower-left-back vertex (LFB), cube 101 and lower-left-front vertex (LLF), cube 103;
3=upper-left-back vertex (ULB), cube 101 and upper-left-front vertex (ULF), cube 103;
6=lower-right-back vertex (LLB), cube 101 and lower-right-front vertex (LRF), cube 103; and
7=upper-fight-back vertex (URB), cube 101 and upper-right-front vertex (URF), cube 103.

Plane 205 repeats the assigned node numbers of plane 201, and so on for the entire lattice. Carefully note that the sharing of vertices (which represent memory nodes) is both horizontal and vertical. Therefore, for example, a node within the array on plane 203 such as node 7 is actually shared with eight cubes. That is, the node numbers that are not common with the first cube are assigned by mirroring the node numbers from the first cube 101 to the present cube 401 as shown in FIG. 4.

Note particularly that the assigning of the node numbers thus illustrated can correspond to the concatenation of the least significant bits of each vector X, Y, and Z. With the vertices assigned node numbers in this manner, each nodes data set (for example, an 8-bit data word for one color, 24-bit for three colors, or 32-bit for four colors) may be stored in a memory bank corresponding to its node number. Any node can be retrieved simultaneously without conflict regardless of where in the three dimensional space of the array that the node exists.

In other words, the cubic lattice is a three dimensional look-up table construct that can be interpolated from a set of two dimensional memory bank. The intersection of any two or more lines indicate a memory location. For example, the memory organization for a system using 8-bit data values in each direction would require eight banks of 512-bytes or 4096 bytes. A ROM, RAM, ASIC, or other integrated circuit of such magnitude is a relatively inexpensive component.

Now, change the variables at each vertex to indicate a color space datum in order to apply the generalized memory organization construct as described above to digital color emulation. For the purpose of the exemplary embodiment, assume that each variable $X_{(horizontal)}$=Rod ("R"),
$Y_{(into\ page)}$=Green ("G"), and
$Z_{(vertical)}$=Blue ("B")

is an eight bit byte of data. It will be recognized that the variables being interpolated can also be cyan, magenta, yellow, or, for that matter, any set of tri-dimensional variables requiring concatenation.

The variables are separated into high and low nibbles of four bits each (that is, the most significant bits ("H" for high) and four least significant bits ("L" for low)):

R(7,6,5,4) or RH,
R(3,2,1,0) or RL,
G(7,6,5,4) or GH,
G(3,2,1,0) or GL,
B(7,6,5,4) or BH, and
B(3,2,1,0) or BL.

Figure 5:
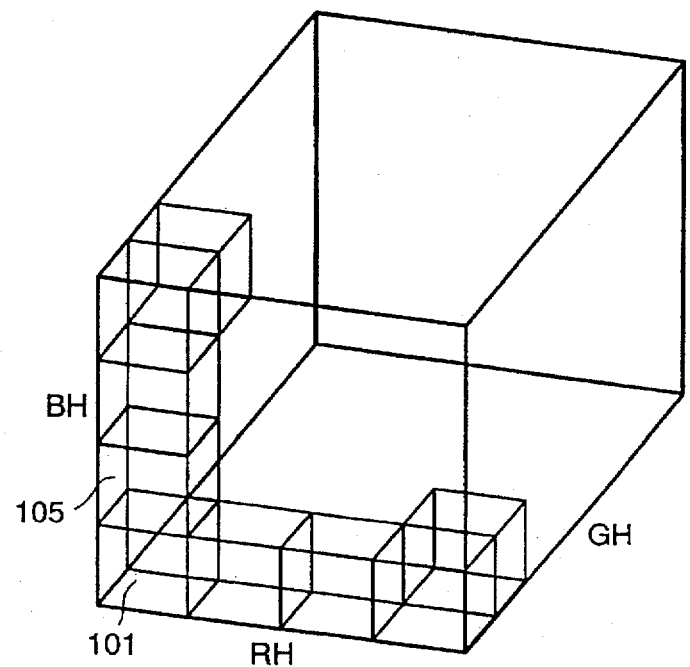
FIG. 5 is a spatial representation of a subsection of a lattice memory organization construct comprising a multiplicity of sections as shown in FIG. 2 for a red, green, blue color space.

The most significant bits (or nibbles)—RH, GH, and BH—are used for the memory addressing (assigned vertex-node designators) and data sorting to be described hereinafter. The least significant bits—RL, GL, and BL—are used for the three dimensional color space data variables, namely data interpolation distance. That is, in an eight-bit byte, the four most significant bits (7 . . . 4)—RH, GH, and BH—are mapped to the cubic representation as shown in FIG. 5. The four least significant bit nibbles (3 . . . 0)—RL, GL, and BL—are used to interpolate data at each vertex-node defined as an addressable color data point; for example, of the CIE 1931 Standard Colorimetric Observer, e.g., a wavelength value of 380 nanometers where X=0.001400, Y=0.000000, and Z=0.006500.

It will be recalled from the foregoing that in order to be able to obtain all eight values from any cubic memory construct simultaneously in order to interpolate in one access cycle, there must be eight separate banks of memory. Thus, the cubic memory array construct is divided into eight memory banks so that none of the information in one bank needs to be accessed more than once per computation.

MEMORY ADDRESSING

As shown in FIG. 5, data points stored in memory require addresses in the cubic construct with RH in the X dimension, GH in the Y dimension and BH in the Z dimension (or other construct as selected by the system designer for the multi-dimensional variable space of interest).

Figure 6:
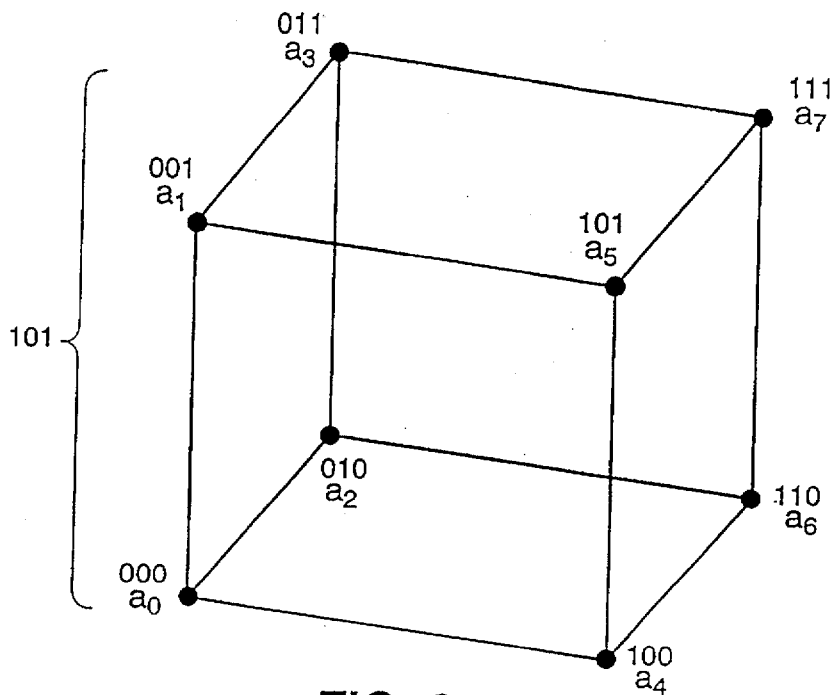
FIG. 6 is a spatial representation of the lattice memory organization construct as shown in FIG. 1, wherein each vertex is assigned an alphanumeric and digital designation.

RH, GH, and BH are combined to form a twelve bit address to the three dimensional mapping cube as exemplified in FIG. 6. The addresses shown on the cube in FIG. 6 are relative addresses to be used for interpolation. FIG. 5 then can be visualized as a three dimensional array of such cubic constructs representative as an addressable memory system. See also, FIGS. 1 through 4.

Figure 7:
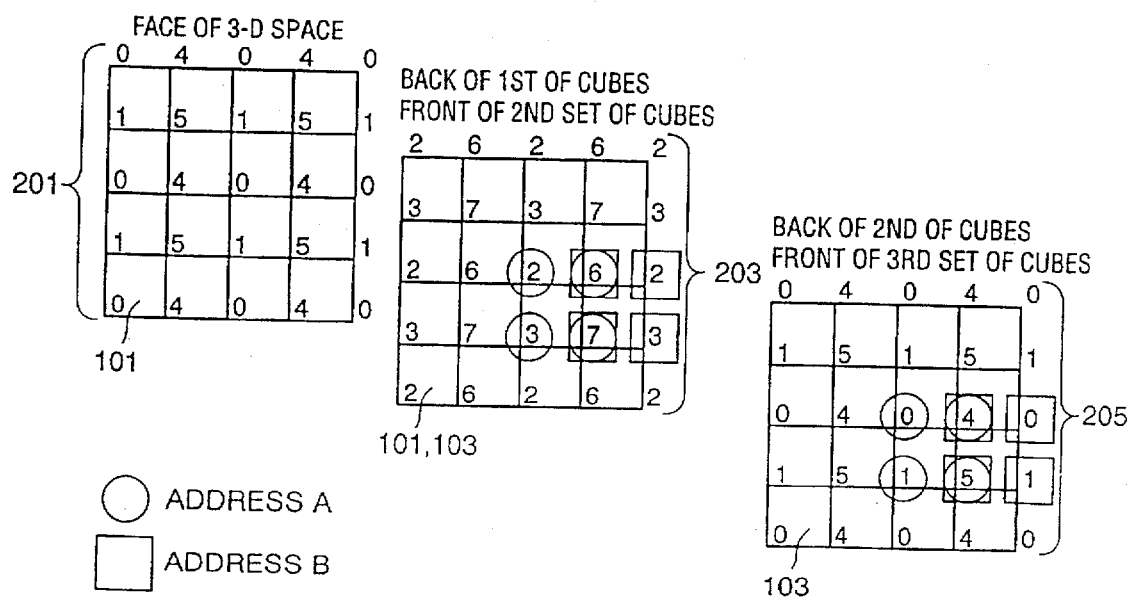
FIG. 7 is a depiction of a slices of the spatial representation of a lattice memory organization construct as shown in FIG. 3 showing possible addressing schemes.

FIG. 7, using the vertex designations as in FIGS. 3 and 4, represents three slices 201, 203, 205 of a 4×4×4 array in the GH address direction as depicted in FIG. 5. These vertex designations are a memory bank related to each location.

Referring back to FIG. 6, relative address 000, $a_0$, is the location pointed to by RH, GH, BH; relative address 001, $a_1$, is the location pointed to by RH, GH, BH+1; and so forth (ref. FIG. 1). Note particularly in this example that there are two possible addresses, address "A" and address "B" for each of the vertices shared by adjacent cubes. Thus, there can be no memory bank conflicts for any address specified during one access cycle event. It should thus be understood as explained above that each interior vertex can thus relate to eight adjacent cubic constructs.

The addressing mechanism employed needs to select the appropriate location within each bank. That is, it must be determined where in each memory bank to obtain the RESULT value associated with the cubic construct in the concatenation of RH, GH and BH. Referring to FIGS. 1 and 4, the assigning of the node numbers illustrated corresponds to the concatenation of the least significant bit of each address byte X(4), Y(4), Z(4)—or for the exemplary embodiment: RH(4), BH(4), GH(4). Therefore, with the vertices assigned these node numbers, each node is stored in a memory bank corresponding to its node number and retrieved simultaneously without conflict regardless of where in the three dimensional color space construct the node virtually exists.

Note particularly, that the system is thus using the least significant bit of memory address as a means for simultaneously bringing memory data out in any concatenation desired.

Figures 8, 9:
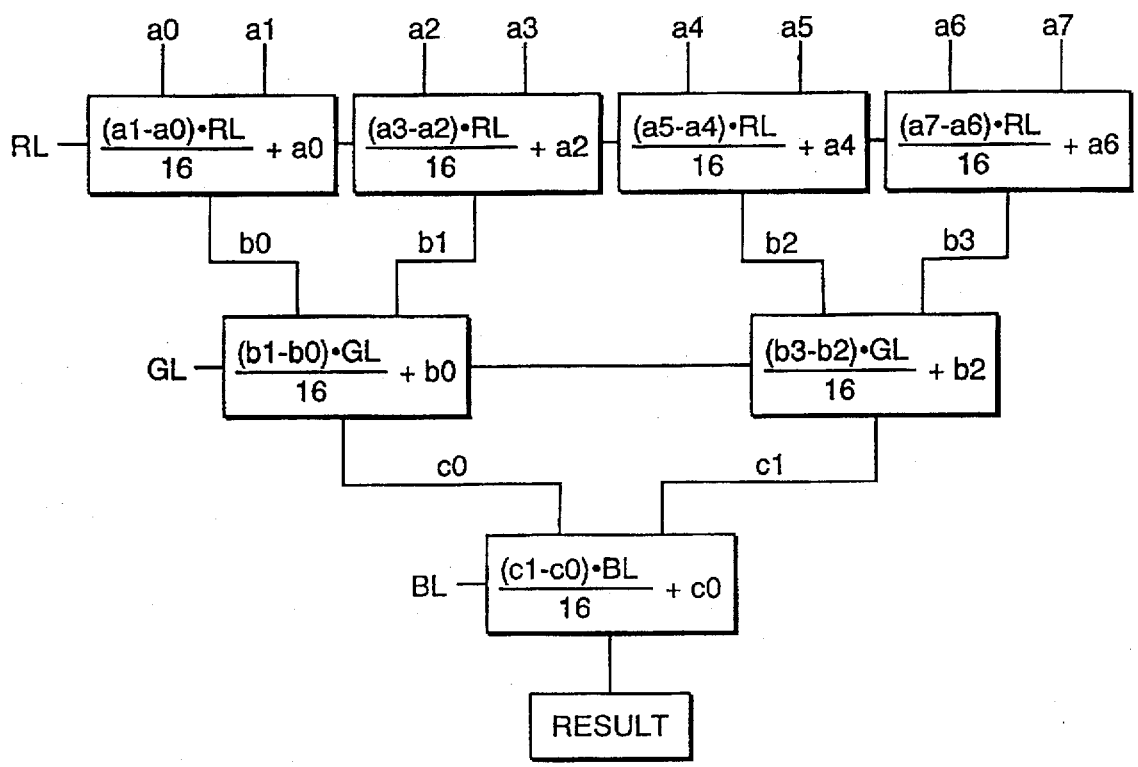
FIG. 8 is a representation of a standard trilinear data interpolation, applied in accordance with the present invention for a red, green, blue color space as shown in FIG. 5.
FIG. 9 (TABLE 1) is an exemplary memory address calculation for a red, green, blue color space as shown in FIG. 4 for the upper lattice construct.

In the example of the 8-bit system, for a memory bank, "M", where M is defined by a 3-bit binary number (e.g., where for bank$_6$: M=110), having bits "(2 . . . 0)," address of the concatenation can be represented as:

$$X(7,6,5)+X(4)\&!M_6(2), Y(7,6,5)+Y(4)\&!M_6(1), Z(7,6,5)+Z(4)\&!M_6(0);$$

read as X bits 7 through 5 add to X bit 4 if $M_6$(bit 2) is logically zero, concatenated with the results from the Y and Z operations. In other words, if a node number is logically shifted in a given direction from the default position which is when node number 0 [or 000/a0 in FIG. 6] is the lower-left-front corner, then the address must be incremented in that direction, which occurs automatically from X(4), Y(4) and Z(4) as depicted in FIGS. 9 and 11.

The addresses need to select the appropriate location within each bank. By using eight banks of memory, only the most significant three bits are required from each nibble RH, GH and BH. Thus, using a total of nine bits, all the information in any bank can be given a unique address. All of the banks use a different address as shown in the TABLE 1, FIG. 9. A complete listing of the X(4), Y(4), Z(4) value used in the address calculation is shown in FIG. 10, TABLE 2, based on the vertex node assignments of FIGS. 3A–3C, 4, 6 and 7. The values in the table illustrate which 3-bit nibbles must be incremented with the headings indicating the orientation of the cube being addressed.

Figure 11:
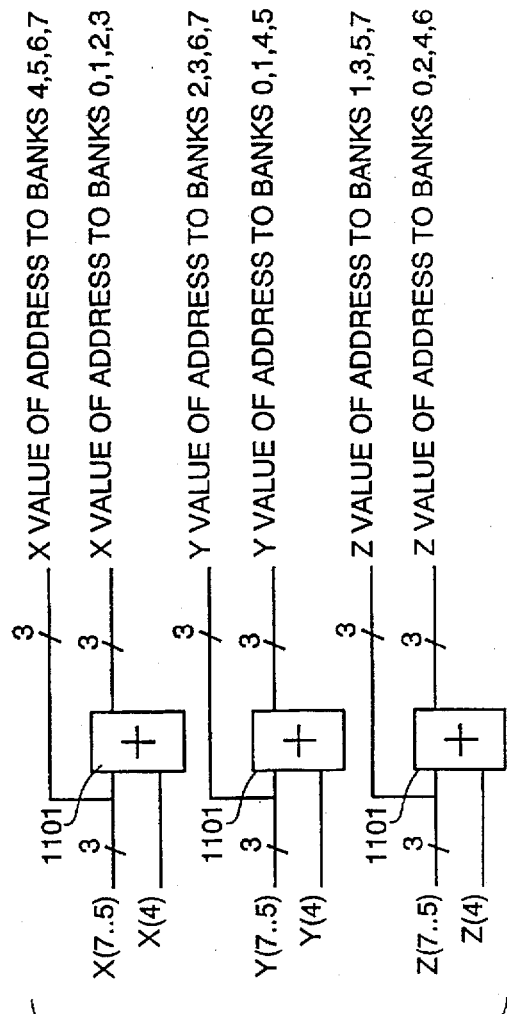
FIG. 11 is a block diagram of an exemplary digital adder configuration for address calculations as shown in FIG. 10.

An example of how the above equation may be implemented is shown in FIG. 11. Adder circuitry 1101 is a typical binary adder as would be known in the art.

To better understand how the addressing scheme works, the following example on a one dimensional system that requires two elements to be retrieved from memory simultaneously is provided. The address for a 8-bit data word would be X(7 . . . 4). The values needed are stored at X(7 . . . 4) and X(7 . . . 4)+1. Now divide the memory into two banks, B0 and B1. One element can be stored and retrieved from each bank simultaneously by letting all of the even addressed elements to be stored in B0 and all of the odd addressed elements in B1. When an address request points to an even address the elements from both banks will be addressed as X(7,6,5). However, when the address request points to an odd address, then the element taken from B1 will be at the address X(7,6,5) and the element taken from B0 will be at the address X(7,6,5)+1. Whenever the address points to an odd value X(4) will be a one and whenever the address points to an even value X(4) will be a zero. Therefore, if X(4) is always added to the address X(7,6,5), going to B0 and taking the address X(7,6,5) directly to B1, the correct values will be obtained from memory. In FIGS. 10 and 11, the concept is extended to three dimensions using eight banks of memory, one for each vertex (note that the concept can likewise be extended to n-dimensions).

DATA INTERPOLATION

The four least significant bits, e.g. RL, GL, BL, from each color designation in the system to be transformed are used for interpolating between the look-up table values in accordance with the following one dimensional interpolation:

$$\frac{(a1-a0)*RL}{16} + a0$$

where $a_1$ and $a_0$ are the data points and RL is the relative distance between them.

The process is expanded to three dimensions to concatenate the three data point variables as shown in FIG. 8. The interpolation process is computed for each translated color as desired. Thus, for interpolating from and RGB system to a CMY system, three segments of memory, one for each color, are required.

Note particularly, this means that for a given exemplary color comprising data point values (e.g., CIE wavelength values) in the RGB scale mapped as RH, GH, BH, the address of the corresponding CMY color will be located at the RESULT interpolation according to FIG. 8. The color conversion can take place one color plane at a time or the interpolation RESULTS can be interleaved by first interpolating for cyan, then for magenta, then for yellow, or by triplicating the interpolator and performing the operations in parallel.

DATA SORTING

It has been shown above that the simultaneous access to eight memory banks to obtain data representing the eight vertices of a tri-dimensional color space can be accomplished. Sorting the data in accordance with the requirements of the input for the interpolator of FIG. 8 to place the values obtained in a logical order when referencing any cube is required.

The sorting order will depend on which node number occurs at the lower-left-front, LLF, corner of the cube being accessed. In accordance with FIGS. 3A and 6, when node 0 is located in the LLF corner, all nodes are in their logically correct position. In any other position, e.g., FIG. 3B, the nodes must be sorted to put them in the correct order. The permutations are shown in TABLE 3, FIG. 12. Each cube in which the LLF number is not zero can be considered as having been logically shifted in any of the three dimensions of the cubic spatial construct. The node number located in the LLF corner designates which orientation the construct is, indicated by the concatenation of X(4), Y(4) and Z(4).

For example, if node $a_4$ is LLF, the cube has be logically shifted in the X axis direction. Therefore, all nodes must be swapped and sorted by that shift. The same is true for the other directions or any combination of the directions. When node $a_7$ is LLF, the nodes must be swapped in all directions, that is, as mirrored in FIG. 4.

Figures 12, 13:
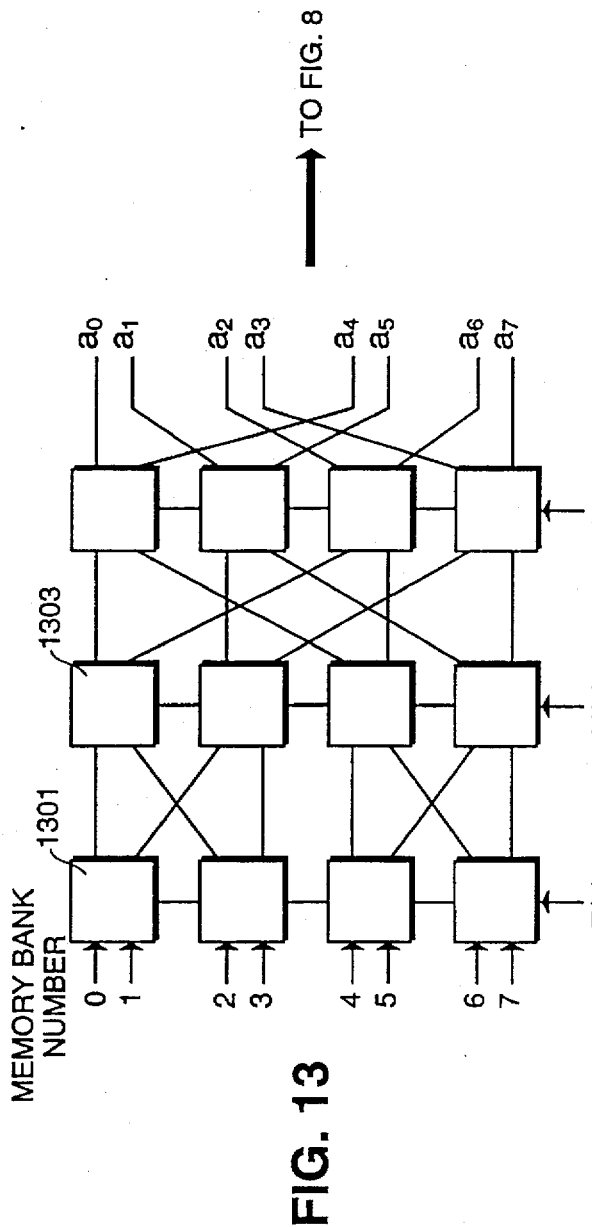
FIG. 12 (TABLE 3) is a complete listing of the sorting permutations required for address data sorting used in accordance with a lattice memory organized in accordance with the present invention as shown in FIGS. 1 through 11.
FIG. 13 is a multistage switching network for use in accordance with sorting permutations as shown in FIG. 12.

Sorting can now be accomplished in a variety of hardware implementations. In the preferred embodiment, a multistage switching network as shown in part in FIG. 13 is used. Each box 1301, 1303, et seq., represents two 2-to-1 multiplexers; when the control bit for the box is set, the two inputs switch places at the output and when the control bit is not set the inputs are in the same relative positions at the output.

For example, when the cube is shifted in the Z direction (node 1 is now in the LLF), nodes 0 and 1 are switched, putting node 1 in the $a_0$ position, LLF, and node 0 in the $a_1$ position, ULF, sorted by control bit Z(4) being set. Thus, in the mirror cube 401 of FIG. 4, when node 7 is in the $a_0$ position, all control bits are set causing all values to be swapped in all directions resulting in a complete reversal of values from input to output (see FIG. 12, first column for a logical cubic memory construct versus last column for a mirror cubic memory construct).

HARDWARE IMPLEMENTATION

Figure 14:
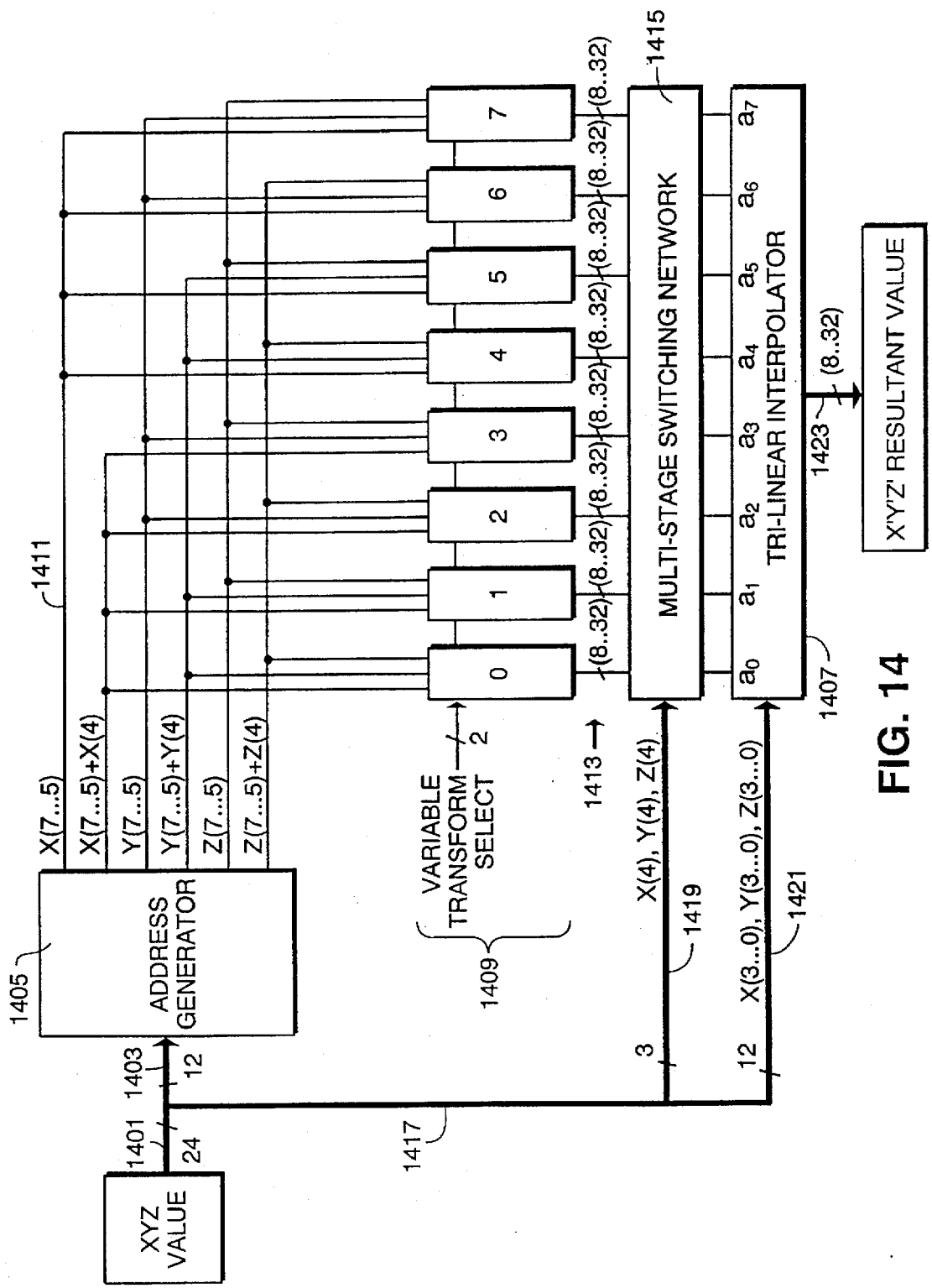
FIG. 14 is a block diagram of a circuit logic implementation of the present invention as shown in FIGS. 1 through 13.

Referring now to FIG. 14, a block diagram for a device for implementing the memory organization, addressing scheme, and sorting mechanism as defined hereinbefore is demonstrated in an exemplary block diagram. The depiction is for an 8-bit implementation (but see memory output 1413 described hereinafter).

An input bus 1401 has twenty-four lines for receiving an 8-bit byte for each data variable to be transformed. Recall that the four most significant bits (7 . . . 4) are used for address generation. For RGB, FIG. 11 demonstrates the address generation where X=R, Y=G, and Z=B. Twelve control lines 1403 thus feed into the address generation circuitry 1405.

The four least significant bits (3 . . . 0) are the data for interpolation in accordance with an arithmetic logic unit (ALU) 1407, the tri-linear interpolator, as also demonstrated in FIG. 8.

Eight memory banks 1409, labeled 0 through 7 in accordance with the color space construct as shown in FIGS. 3 and 4 are connected to the address generator 1405 by control lines 1411 in accordance with FIGS. 9, 10 and 11. A two-bit transformation select signal designating which variable is multiplexed with the X, Y, Z values in order to determine which variable is being interpolated during the access cycle. The two bits designate the output color desired and will be generated by the system, a state machine or counter, depending upon implementation as would be known in the art and whether the interpolation is done in planes or interleaved.

Values selected from each memory bank 1409 are output 1413 to the multistage switching network 1415 in accordance with FIG. 13 to sort the selections for the interpolator 1407. In the alternative, the switching network can be expanded to provide a 24-bit implementation or 32 whereby all four variables can be determined in a single operation rather than individually, eliminating the need for the two bit transformation select word 1409.

From the input lines 1401, a bus 1417 feeds bit four to the multistage switching network in accordance with FIG. 13 via bus 1417 for sorting the data. The four least significant bits X(3 . . . 0), Y(3 . . . 0), and Z(3 . . . 0) that represent the interpolation distance are routed via bus 1417 and 1421 to the tri-linear interpolator in accordance with FIG. 8 for use with the output of the multistage switching network 1415 outputs $a_0$ through $a_7$. The output of the interpolator 1407—designated X'Y'Z' in FIGURE—will be the color values interpolated from RGB to CMY. An eight-bit value for each color is output on bus 1423 (8 . . . 32). Therefore, 8-, 16-, 24-, or 32-bit would be appropriate bus widths.

Based upon the foregoing exemplary embodiment, a relatively small ASIC is readily produced using approximately 3300 gates for the interpolator, 600 gates for the multistage switching network, 30 gates for the address generator 1405, and 12,288 memory locations (8 banks×512 bytes×3 colors), using a standard 68 pin package.

Thus, the derived information is accomplished by the described system in that, as shown in FIG. 14, the least significant bit of each upper nibble, RH(4), GH(4), and BH(4) to create an address to only the eight banks without redundancy in any one access and for generating the sorting to accomplish the tri-linear interpolation in said one access without the duplication of memory, viz. an 8× reduction. That is, a three-dimensional memory is divided into eight pieces, accessed simultaneously and sorted by use of those upper nibble LSB control lines.

EXAMPLE

Figure 15A:
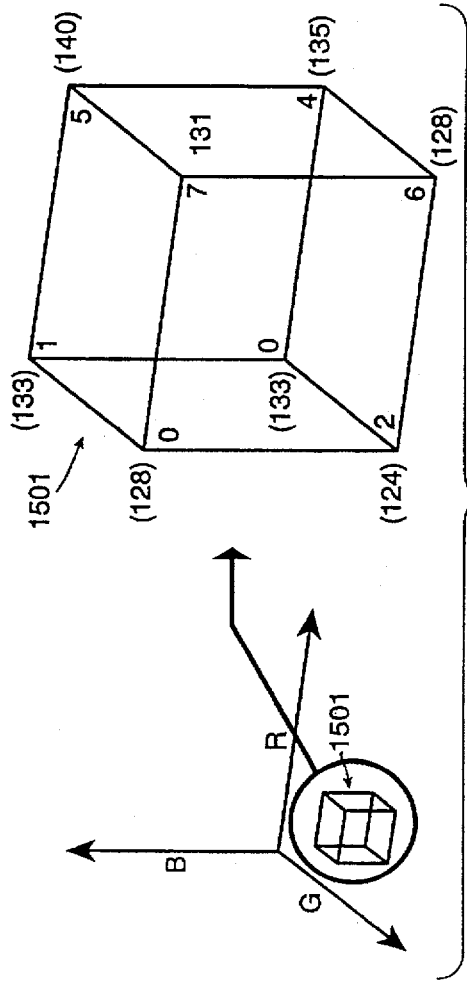
FIGS. 15A–15C is a depiction of an example in accordance with the present invention.
Figure 15B:
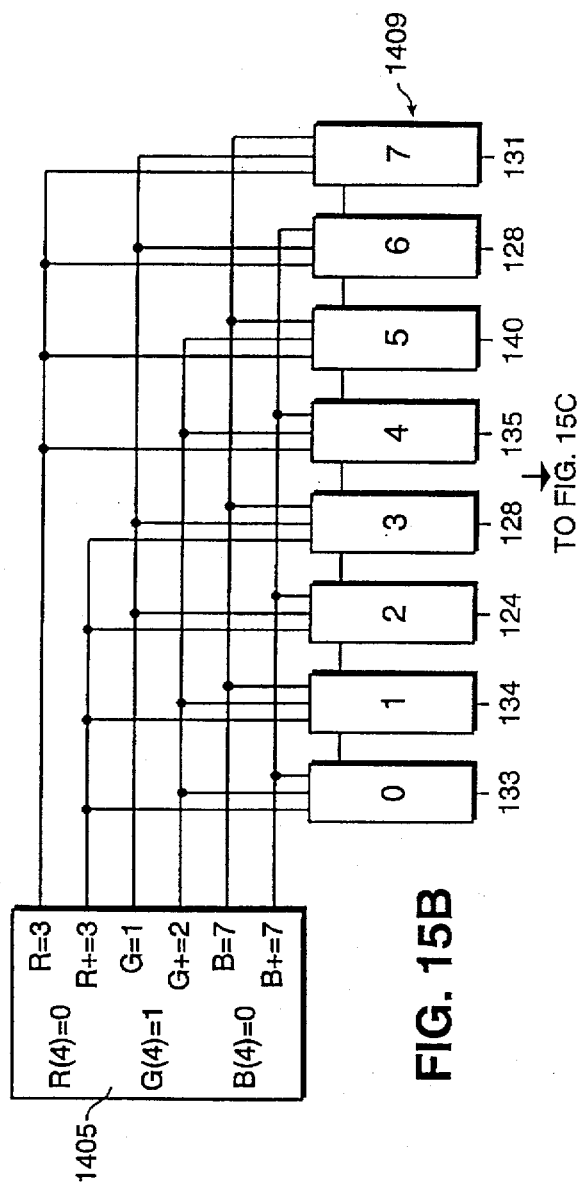
Figure 15C:
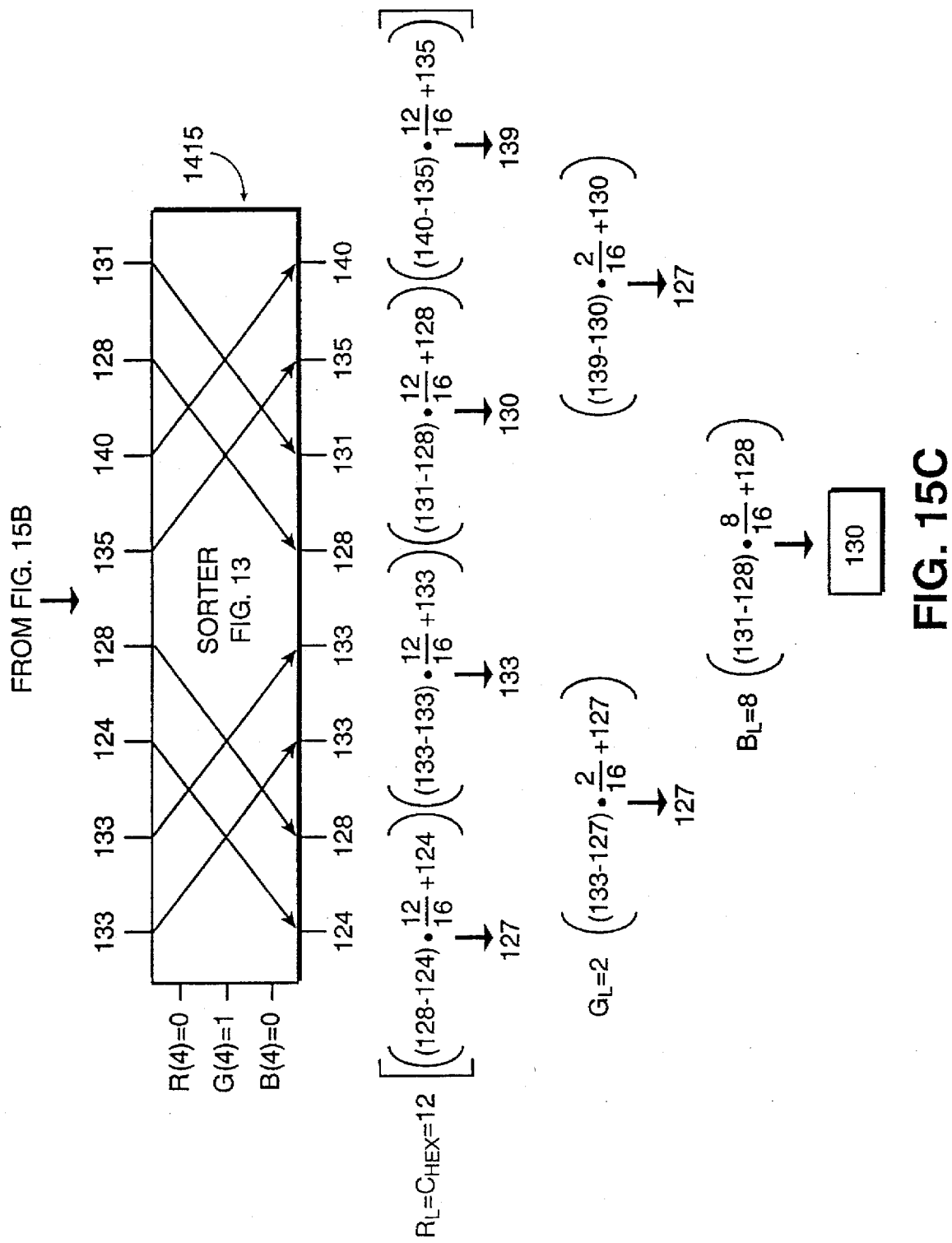

Referring to FIGS. 15A–15C, a memory construct 1501 of a color space where RGB is to be converted to CMY. The addressable nodes of the cubic construct represent for example values in a CMY transformation color space. Given an RGB color value set of 6C, 32, E8 (hexadecimal), the problem is to translate the value to a CMY value set. Therefore, for R = 01101100$_2$,
G = 00110010$_2$,
B = 11101000$_2$, and

| R(7 . . . 5) = 3 | R(4) = 0 | R(3 . . . 0) = $C_{hex}$ [viz. 12] |
|---|---|---|
| G(7 . . . 5) = 1 | G(4) = 1 | G(3 . . . 0) = 2 |
| B(7 . . . 5) = 7 | B(4) = 0 | B(3 . . . 0) = 8. |

The output of the address generator 1405 is shown in FIG. 15B (viz., FIG. 11 adder output), where $R_+$, $G_+$, $B_+$ are the outputs from the adder 1101. The sorting implementation (as shown in FIGS. 12 and 13) is depicted for this Example in FIG. 15C, where the least significant bit—R(4), G(4), B(4) —correlates to the third column in FIG. 12. The mathematical interpolation (see FIG. 8) for the Example is shown as part of FIG. 15C. The resultant interpolated value, 130, is thus an interpolated one of the three (or 82$_{HEX}$) CMY data point values within the color space of the cube.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. A device for transforming multiple variable, non-linear input data, where "n" is the number of variables, and for providing interpolated output data, comprising:

a set of $2^n$ memory means, each having an input and an output, for storing transform data correlated to said input data at discrete addressable locations therein and for providing said transform data at each output;

address generating means, connected to each of said memory means' input, for receiving a first set of predetermined bits of said input data and for providing an address to access one location of each of said memory means per input access cycle in accordance with said first set of predetermined bits of said input data, said memory means providing accessed transform data at each output of said memory means, respectively;

sorting means for sorting said transform data, having
  first input means, connected to each said memory means output, respectively, for receiving accessed transform data from said locations,
  second input means connected to receive a first predetermined subset of said first set of predetermined bits of said input data such that said transform data is ordered in accordance with said first predetermined subset of said first set of predetermined bits of said input data, and output means for outputting sorted transform data; and interpolating means for interpolating said sorted transform data with a second set of predetermined bits of said input data, having first input means, connected to said output means of said sorting means, for receiving said sorted transform data, second input means connected to receive said second set of predetermined bits of said input data, and output means for outputting interpolated output data based on interpolating said sorted transform data with said second set of predetermined bits of said input data.

2. The device as set forth in claim 1 wherein said memory means further comprise:

input means for receiving a signal determinative as to which variable of said input data multiple variables is to be transformed during a current input access cycle.

3. The device as set forth in claim 1, wherein said set of $2^n$ memory means comprises:

means for emulating a n-dimensional spatial construct wherein said transform data is stored such that each correlated variable of said transform data can be accessed in one access cycle without duplication of said set of $2^n$ memory means.

4. The device as set forth in claim 3, wherein said means for emulating a n-dimensional spatial construct further comprises:

a memory device emulating an array of polyhedral constructs, each polyhedral having $2^n$ vertices and wherein each vertex has a designator representative of one said memory means.

5. The device as set forth in claim 4, further comprising:

each said memory device having a plurality of addressable locations representative of the vertices of said polyhedral construct wherein said transform data is stored at addressable locations such that all vertices of any polyhedral in said array can be accessed in parallel by accessing each memory device once during a single access cycle.

6. The device as set forth in claim 4, further comprising:

said addressable locations each containing a transform data word stored in a memory device which is addressable corresponding to its vertex designator such that any vertex can be retrieved simultaneously without conflict regardless of where in the n-dimensional space of the construct that vertex exists.

7. The device as set forth in claim 3, wherein n=3, said means for emulating a n-dimensional spatial construct further comprises:

eight memory banks having addressable locations representative of the eight vertices of a cube wherein said transform data is stored such that all eight vertices can be accessed in parallel by accessing each memory bank during a single access cycle.

8. The device as set forth in claim 3, said means for emulating a n-dimensional spatial construct further comprises:

a 4×4×4 cubic construct (n=3), each cube having eight vertices; and each vertex is a designated as a separate memory bank "M", where M has the range 0–7, such that each diagonally adjacent cube has vertex designations mirroring its said diagonally adjacent cube, whereby any vertex of said construct can be retrieved simultaneously without conflict.

9. The device as set forth in claim 8, wherein said input data is an eight bit digital data word for each said variable represented as X, Y and Z, said sorting means further comprises:

means for concatenation of said first set of predetermined bits of said input data in accordance with the function:

$$X(t,s,r)+X(q)\&!M(1),\ Y(t,s,r)+Y(q)\&!M(k),\ Z(t,s,r)+Z(q)\&!M(j),$$

where "t,s,r,q" are contiguous bits and "q" is the least significant bit and said first predetermined subset of said first set of predetermined bits of said input data, and where "l,k,j" are contiguous bits and "j" is the least significant bit of the memory bank number, M, of said set of memory banks.

10. The device as set forth in claim 8, wherein said input data is an eight bit digital data word for each said variable represented as X, Y and Z, said sorting means further comprises:

means for concatenation of said first set of predetermined bits of said input data in accordance with the function:

$$X(7,6,5)+X(4)\&!M(2),\ Y(7,6,5)+Y(4)\&!M(1),\ Z(7,6,5)+Z(4)\&!M(0).$$

11. A device for transforming a first three dimensional color space tristimulus color for a color represented by input data words X(m–1, m–2 . . . 0), Y(m–1, m–2 . . . 0), and Z(m–1, m–2 . . . 0), where m=a total number of bits of a data word, to a second three dimensional color space tristimulus color represented by output data words X'(m–1, m–2 . . . 0), Y'(m–1, m–2 . . . 0), and Z'(m–1, m–2 . . . 0), comprising:

an address generator, having input means and an output means, for receiving a first set of predetermined bits of a first three dimensional color space tristimulus color word via said input means and providing address signals on said output means;

a set of eight memory banks, each having input means, selectively connected to said output means of said address generator for receiving address signals to access one location of each said memory bank per access cycle in accordance with said first set of predetermined bits;

addressable memory locations storing second three dimensional color space tristimulus color transform words correlated to said first three dimensional color space tristimulus color words;

output means for providing said second three dimensional color space tristimulus color transform words from said locations;

a sorter for sorting accessed location transform words, having first input means, selectively connected to output means of said memory banks, for receiving said transform words, second input means, connected to receive a first predetermined subset of said first set of predetermined bits such that said transform words are ordered in accordance with said first predetermined subset as sorted transform words, and eight output means for outputting said sorted transform words; and an interpolator for interpolating said sorted transform words with a second set of predetermined bits of said color word, having eight first input means, connected to said sorter output means, respectively, for receiving said sorted transform words, second input means, connected to receive said second set of predetermined bits of said color word, and output means for providing said second three dimensional color space tristimulus color, whereby said first three dimensional color space tristimulus color for a color represented by data words X(m−1, m−2 . . . 0), Y(m−1, m−2 . . . 0), and Z(m−1, m−2 . . . 0) is transformed to a second three dimensional color space tristimulus color represented by data words X'(m−1, m−2 . . . 0), Y'(m−1, m−2 . . . 0), Z'(m−1, m−2 . . . 0) which are interpolations of said stored second three dimensional color space tristimulus color transform words correlated to said first three dimensional color space tristimulus color words.

12. The device as set forth in claim 11 wherein each said memory banks further comprises:

an input for receiving a signal determinative as to which tristimulus color, X, Y or Z, is to be transformed during a current access cycle.

13. The device as set forth in claim 11, wherein said set of eight memory banks comprises:

means for emulating a three dimensional space construct wherein said transform words are stored such that each word of said transform data can be accessed in one access cycle without duplication of said set of eight memory banks.

14. The device as set forth in claim 13, wherein said means for emulating a three dimensional space construct further comprises:

said set of eight memory banks having addressable locations representative of an array of cubes construct of the eight vertices of a cube wherein said transform words are stored such that all eight vertices on any cubic construct can be accessed in parallel by accessing each memory bank during a single access cycle.

15. The device as set forth in claim 11, wherein said sorter further comprises:

means for concatenation of said first set of predetermined bits of said first three dimensional color space tristimulus color in accordance with the function:

$$X(t,s,r)+X(q)\&!M(1), Y(t,s,r)+Y(q)\&!M(k), Z(t,s,r)+Z(q)\&!M(j),$$

where "t,s,r,q" are contiguous bits and "q" is the least significant bit and said first predetermined subset of said first set of predetermined bits of said input data, and where "l,k,j" are contiguous bits and "j" is the least significant bit of the memory bank number "M" of said set of memory banks.

16. The device as set forth in claim 15 wherein said interpolator further comprises:

a tri-linear interpolator device.

17. A method for transforming multi-variable, non-linear input data represented by first words representative of each variable, where "n" represents the number of bits in each said first word to be transformed, to an interpolated output data, comprising:

storing second words in a retrievable manner wherein each said second word is a transformation data point correlated to an input data point color;

providing each first word with a predetermined set of bits, "a", where "a" is less than "n", defined as addressing and sorting bits and a predetermined set of data bits, "d", defined as a predetermined data point color;

using said first predetermined set of bits "a" to retrieve predetermined second words from storage locations designated by said predetermined set of bits "a" and to sort said stored second words into a logical order;

interpolating said predetermined second words using said data bits "d" and a non-linear transform based upon the number of variables; and outputting interpolated second data words.

18. The method as set forth in claim 17, wherein said step of storing second words further comprises:

providing $2^x$ memories, where x equals the number of variables, each having predetermined second words stored in an organization such that no memory requires more than one access per input data transform event to retrieve said second word correlated to an input data point.

19. The method as set forth in claim 17, wherein said step of using said first predetermined set of bits "a" to retrieve predetermined second words from storage locations designated by said predetermined set of bits "a" and to sort said stored second words into a logical order further comprises:

concatenating a first predetermined subset of said first predetermined set of bits "a" with remaining bits of said first predetermined set of bits "a."

20. The method as set forth in claim 18, wherein said step of using said first predetermined set of bits "a" to retrieve predetermined second words from storage locations designated by said predetermined set of bits "a" and to sort said stored second words into a logical order further comprises:

selecting a first variable of said multi-variables to be transformed and retrieving those second words necessary to obtain a interpolated second data word correlated to said first variable.

21. The method as set forth in claim 20, further comprising:

repeating said step of selecting for each variable of said data to be transformed.

22. A method for transforming color space data from a first tristimulus space construct to a second tristimulus space construct wherein data point colors in each said construct are represented by words representative of a color, where "n" represents the number of bits in each said word, comprising:

storing second tristimulus space data point colors in an individually retrievable mode wherein said second tristimulus space data point colors are each defined as a data point color correlated to a particular first tristimulus space data point color;

providing each first tristimulus space word with a predetermined set of bits, "a", where "a" is less than "n", defined as addressing and sorting bits and a predetermined set of data bits, "d", defined as a predetermined first tristimulus space data point color;

using said first predetermined set of bits "a" to retrieve second tristimulus space data point colors correlated to particular first tristimulus space data point colors from storage locations designated by said predetermined set of bits "a" and to sort retrieved second tristimulus space construct data point colors into a logical order;

interpolating retrieved second tristimulus space data point colors using said data bits "d" and a tri-linear transform; and outputting interpolated second tristimulus space data point colors.

23. The method as set forth in claim 22, wherein said step of storing said second tristimulus space data point colors further comprises:

provicing a set of eight memory banks having said second tristimulus space data point colors are stored in an order such that no memory requires more than one access per transform event.

24. The method as set forth in claim 23, wherein said step of using said first predetermined set of bits "a" to retrieve second tristimulus space data point colors correlated to particular first tristimulus space data point colors from storage locations designated by said predetermined set of bits "a" and to sort retrieved second tristimulus space construct data point colors into a logical order, further comprises:

concatenating a first predetermined subset of said first predetermined set of bits "a" with remaining bits of said first predetermined set of bits "a".

25. The method as set forth in claim 22, wherein said step of using said first predetermined set of bits "a" to retrieve second tristimulus space data point colors correlated to particular first tristimulus space data point colors from storage locations designated by said predetermined set of bits "a" and to sort retrieved second tristimulus space construct data point colors into a logical order, further comprises:

selecting a first variable of said tristimulus color space to be transformed and retrieving those second tristimulus space construct data point colors necessary to obtain an interpolated second data word correlated to said first variable.

26. The method as set forth in claim 25, further comprising:

repeating said step of selecting for each variable of said data to be transformed.

27. The method as set forth in claim 24, wherein said step of concatenating a first predetermined subset of said first predetermined set of bits "a" with remaining bits of said first predetermined set of bits "a" further comprises:

concatenating said first set of predetermined bits of said first three dimensional color space tristimulus color in accordance with the function:

$$X(t,s,r)+X(q)\&!M(l),\ Y(t,s,r)+Y(q)\&!M(k),\ Z(t,s,r)+Z(q)\&!M(j),$$

where "t,s,r,q" are contiguous bits of said first tristimulus space word wherein "q" is the least significant bit and said first predetermined subset of said first set of predetermined bits of data, and where "l, k, j" are contiguous bits and "j" is the least significant bit of the memory bank number, M, of said set of eight memory banks.

* * * * *